United States Patent
Watanabe et al.

(10) Patent No.: US 9,248,529 B2
(45) Date of Patent: Feb. 2, 2016

(54) ASSEMBLING APPARATUS

(75) Inventors: Noriyasu Watanabe, Kariya (JP);
Hirotsugu Miyaki, Kariya (JP); Hiroshi Tsuge, Kariya (JP); Kazuyuki Yamaguchi, Kariya (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 330 days.

(21) Appl. No.: 13/817,978

(22) PCT Filed: May 9, 2011

(86) PCT No.: PCT/JP2011/060628
§ 371 (c)(1),
(2), (4) Date: Feb. 20, 2013

(87) PCT Pub. No.: WO2012/035819
PCT Pub. Date: Mar. 22, 2012

(65) Prior Publication Data
US 2013/0145614 A1    Jun. 13, 2013

(30) Foreign Application Priority Data
Sep. 13, 2010    (JP) ................... 2010-204381

(51) Int. Cl.
B23P 11/00    (2006.01)
F16H 25/08    (2006.01)
B23P 19/04    (2006.01)
B23P 19/06    (2006.01)

(52) U.S. Cl.
CPC ............... *B23P 11/00* (2013.01); *B23P 19/04* (2013.01); *B23P 19/06* (2013.01); *F16H 25/08* (2013.01); *Y10T 29/53* (2015.01); *Y10T 29/53687* (2015.01); *Y10T 29/53848* (2015.01)

(58) Field of Classification Search
CPC .......... B23P 19/00; B23P 19/02; B23P 19/04; B23P 19/06; B23Q 5/027; B23Q 5/04; B23Q 5/043; B25F 5/001; B25J 18/04; F16H 35/00; F16H 25/08; F16H 25/12; F16H 25/2018; F16H 25/2025; Y10T 29/53687; Y10T 29/53691; Y10T 29/53848; Y10T 29/54
See application file for complete search history.

(56) References Cited

U.S. PATENT DOCUMENTS 5,127,281 A  *  7/1992  Yanawgisawa ............. 74/89.28
5,327,795 A  *  7/1994  Katahira ....................... 74/89.3
6,298,547 B1    10/2001  Okuda et al.

FOREIGN PATENT DOCUMENTS

| JP | 60-48227 A | 3/1985 |
| JP | 61-38892 A | 2/1986 |
| JP | 2001-30121 A | 2/2001 |

(Continued)

OTHER PUBLICATIONS

Translation of JP 61038892.*

(Continued)

*Primary Examiner* — Ryan J Walters
*Assistant Examiner* — Matthew P Travers
(74) *Attorney, Agent, or Firm* — Sughrue Mion, PLLC

(57) ABSTRACT

An assembling apparatus (1) comprises a shaft member (3) having a linear assembling function and a rotational assembling function, a base (2) supporting the shaft member (3) to be movable in the axial direction and rotatable axially, and a drive unit moving in an axial direction and axially rotating the shaft member (3).

9 Claims, 6 Drawing Sheets

(56) References Cited

FOREIGN PATENT DOCUMENTS

| JP | 2004-237426 A | 8/2004 |
|---|---|---|
| JP | 2007-88510 A | 4/2007 |

OTHER PUBLICATIONS

Office Action issued on Oct. 2, 2013 in corresponding Japanese Patent Application 2012-533883.

* cited by examiner

ASSEMBLING APPARATUS

BACKGROUND OF THE INVENTION

Embodiments of the present invention relate to an assembling apparatus which may perform a plurality of types of assembling work.

DESCRIPTION OF THE RELATED ART

An assembling apparatus of the related art has a fixed head and a movable head rotatably attached to the fixed head. A screw tightening tool and a grip tool are provided on the movable head (see, Japanese Laid-Open Patent Publication 60-48227). The screw tightening tool and the grip tool can be moved between a use position and a non-use position by rotating the movable head with respect to the fixing head. The screw tightening tool is coupled to an output shaft member provided on the fixed head when located in the use position and axially rotates the screw. The grip tool is coupled to the output shaft member when located in the use position and can grip an article using a pair of arms which rotate at an eccentric position. Accordingly, the assembling apparatus can perform a plurality of assembling works.

An assembling apparatus of the related art disclosed in Japanese Laid-Open Patent Publication 2001-30121 has a base. A press-fitting mechanism and a tightening mechanism are provided on the base. The press-fitting mechanism linearly advances by a first power source and can press a first object into a second object. The tightening mechanism can axially rotate a bolt by a second power source. Accordingly, the assembling apparatus may perform a plurality of types of assembly.

The assembling apparatus described in Japanese Laid-Open Patent Publication 60-48227 performs a plurality of assembling works with a rotational motion obtained by an output of a motor. In such an apparatus, however, linear motion cannot be obtained. The assembling apparatus disclosed in Japanese Laid-Open Patent Publication 2001-30121 can obtain the linear motion and the rotational motion, however, a dedicated first shaft member for linear motion and a dedicated second shaft member for rotational motion are required. Thus, there is a problem that the assembling apparatus is large or heavy. Accordingly, there is a need in the related art for an assembling apparatus which may perform the rotational motion and the linear motion by one shaft member.

SUMMARY OF THE INVENTION

In one aspect of the present invention, an assembling apparatus comprises a shaft member having a linear assembling function and a rotational assembling function, a base supporting the shaft member which is movable in an axial direction and axially rotatable, and a drive unit moving which can move the axial direction and axially rotate the shaft member.

Accordingly, the shaft member may perform a linear assembling work using movement in the axial direction and a rotational assembly work using axial rotation. In addition, the assembling apparatus may perform both linear assembling work and rotational assembling work using one shaft member. Thus, the assembling apparatus can be manufactured such that it is small and/or lightweight. For example, the apparatus of the invention can be smaller or lighter in weight compared to the assembling apparatus of the related art. Such related art has a dedicated shaft member which performs linear motion and a dedicated shaft member which performs rotational motion.

DETAILED DESCRIPTION OF THE INVENTION

Figure 1:
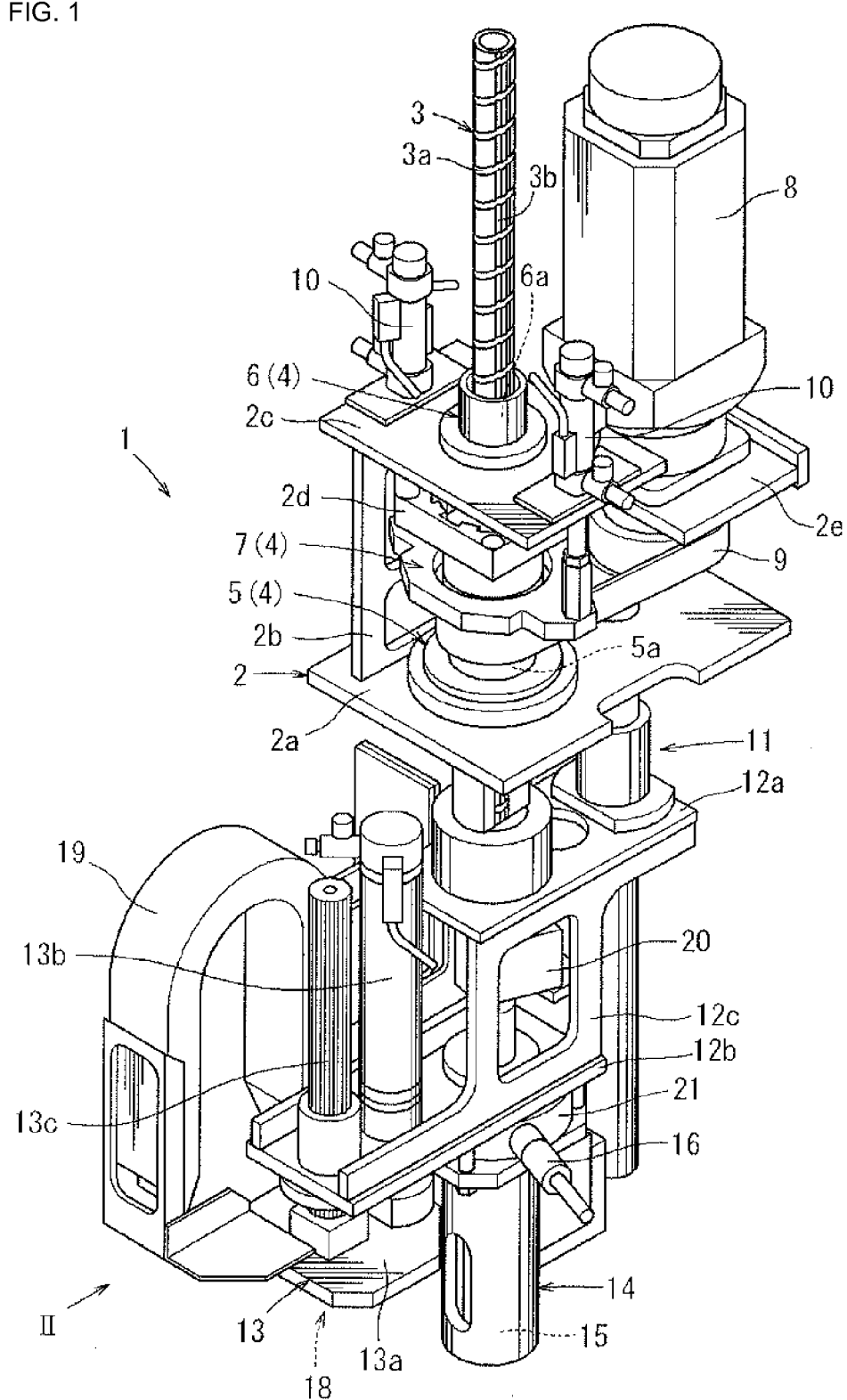
FIG. 1 is a perspective view of an assembling apparatus.

One embodiment of the present invention is described with reference to FIGS. 1 to 7. As shown in FIG. 1, an assembling apparatus 1 is an apparatus (a multifunctional tool) which may perform a plurality of assembling works required in producing vehicle parts or the like. The assembling apparatus 1 has a base 2, a shaft member 3 and a drive unit (a motor 8 and a power conversion mechanism 4).

Figure 2:
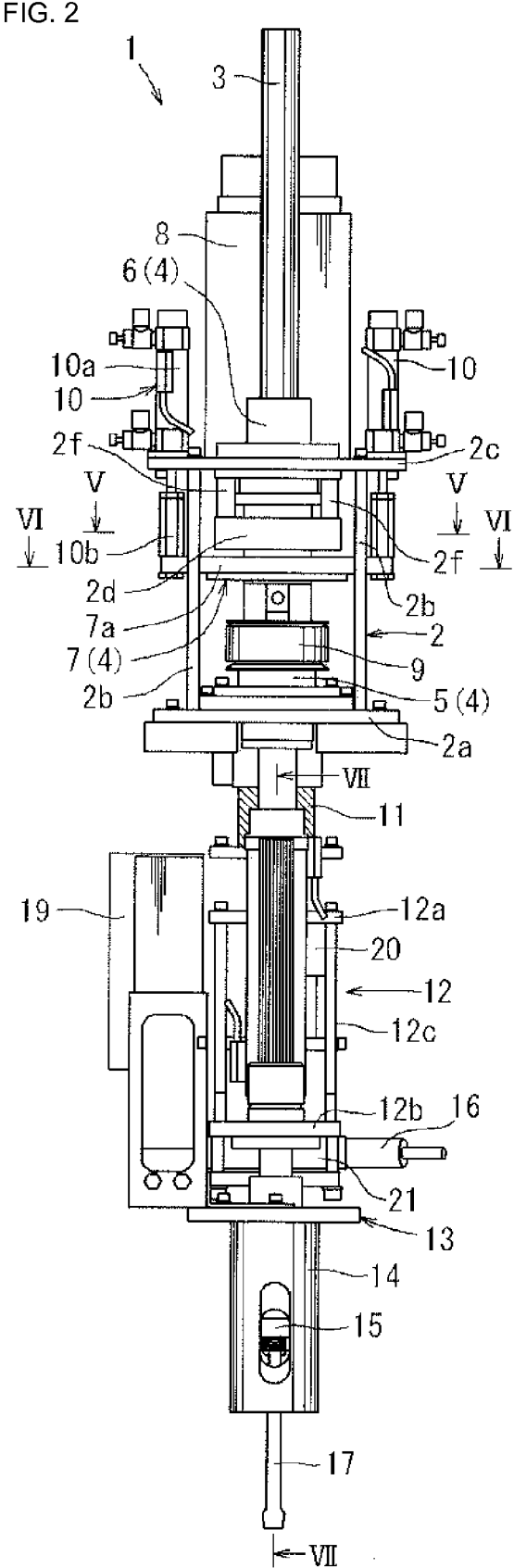
FIG. 2 is a plan view of the assembling apparatus taken a direction of arrow II in FIG. 1.

As shown in FIGS. 1 and 2, the base 2 has first to fifth bases 2a to 2e. The first base 2a has a plate-shape and is placed substantially horizontally, and attached to the base 2 wherein it is movable in the horizontal direction using a XY roader (not shown). Second bases 2b stand on both end portions of an upper surface of the first base 2a. A third base 2c is attached to the upper end portion of a pair of second bases 2b. A fourth base 2d is fixed to a lower side of the third base 2c by attachment portions 2f. A fifth base 2e extends laterally from the third base 2c. The motor 8 is mounted on the fifth base 2e. The motor 8 is, for example, a servo-motor and the rotational speed of its output shaft is controlled by a controller (not shown).

As shown in FIGS. 1 and 2, the shaft member 3 has a cylindrical shape and is mounted to the base 2 to be axially rotatable and movable in the axial direction. A male screw 3a and a plurality of splines 3b are formed on an outer peripheral surface of the shaft member 3. The male screw 3a extends in a spiral manner on the outer peripheral surface of the shaft member 3. The male screw 3a has a screw groove and a screw thread formed between the screw grooves. The splines 3b are recessed on the outer peripheral surface of the shaft member 3 and then linearly extend in the axial direction.

Figure 3:
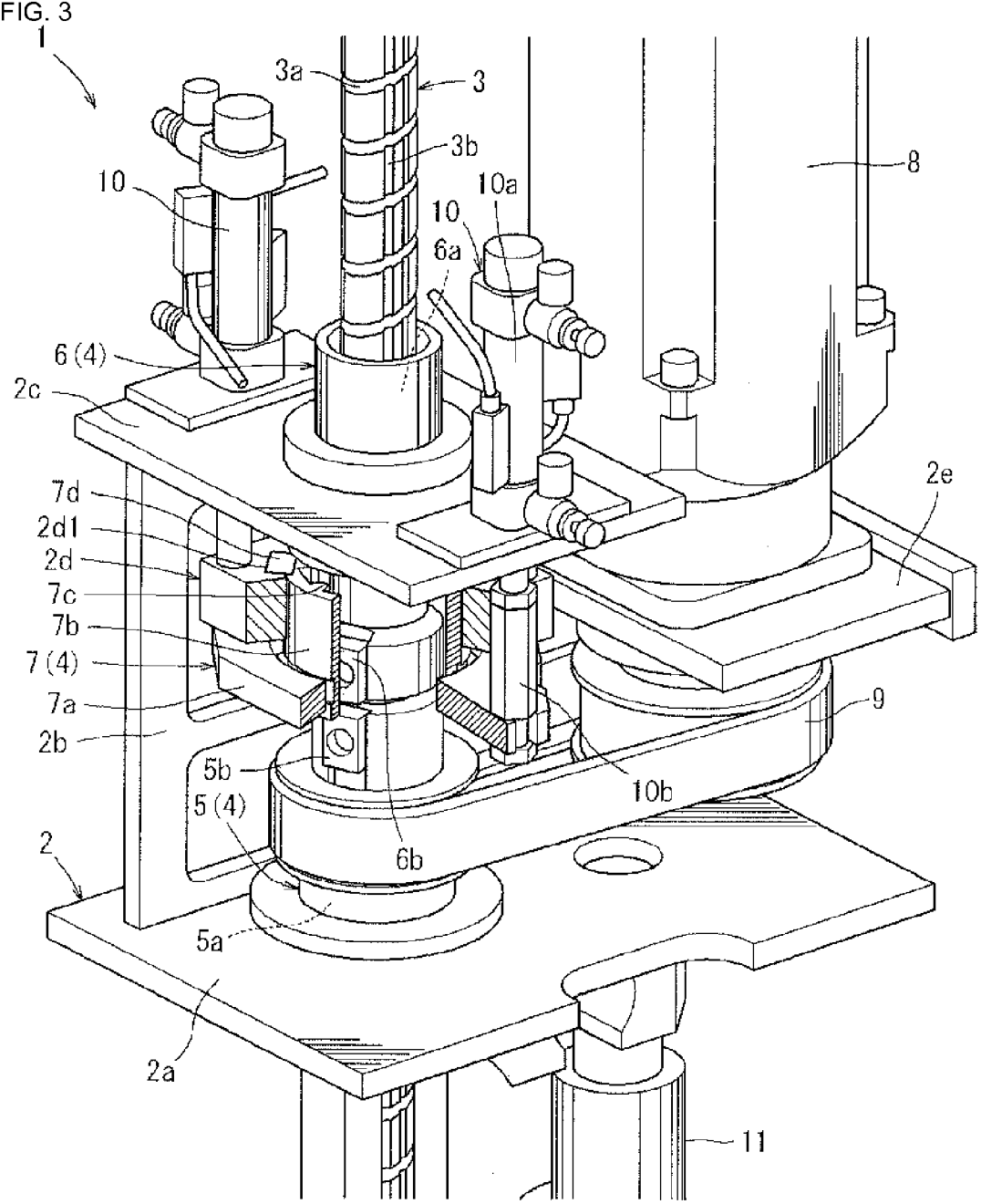
FIG. 3 is a perspective view of one part of the assembling apparatus when a shaft member may be moved in an axial direction.

As shown in FIG. 3, the drive unit has the motor 8 and the power conversion mechanism 4. The power conversion mechanism 4 has a linear motion mechanism for moving the shaft member 3 in the axial direction, a rotation mechanism for axially rotating the shaft member 3 and switching mechanism. The linear motion mechanism is mechanism which converts the output of the motor 8 into the movement of the shaft member 3 in the axial direction, and has a first member 5 and the male screw 3a formed on the shaft member 3.

As shown in FIG. 3, the first member (a screw nut) 5 has a substantially cylindrical shape and the shaft member 3 is inserted through a center hole of the shaft member 3. A lower portion of the first member 5 is inserted into the first base 2a.

A bearing is provided between the outer peripheral surface of the lower portion of the first member 5 and the first base 2a so that they are rotatably connected and may be regulated in the movement in the axial direction. A first engagement portion 5a, which slidably engages the male screw 3a, is formed at the inner periphery surface of the first member 5. The first engagement portion 5a is, for example, a female screw spirally extending to the inner periphery surface of the first member 5.

Figure 4:
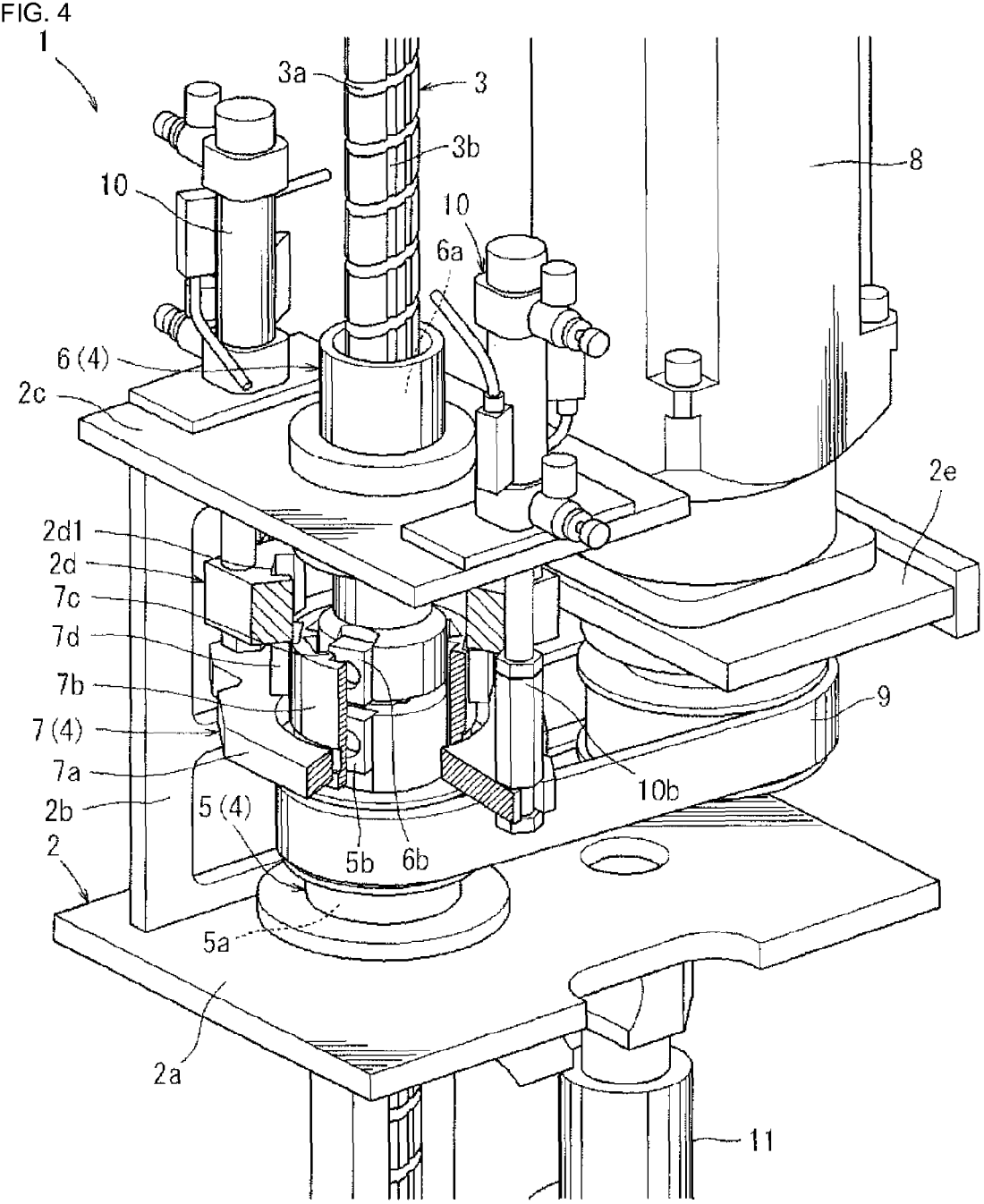
FIG. 4 is a perspective view of the one part of the assembling apparatus when the shaft member may be rotated around an axis of the shaft member.

As shown in FIGS. 3 and 4, the rotation mechanism is a mechanism which converts the output of the motor 8 into the axial rotation of the shaft member 3, and has a second member 6 and the splines 3b formed on the shaft member 3. As shown in FIG. 3, the second member (a spline nut) 6 has a substantially cylindrical shape and a center hole in which the shaft member 3 is inserted. The lower portion of the second member 6 is inserted into the third base 2c. A bearing is provided between the outer peripheral surface of the lower portion of the second member 6 and the third base 2c so that they are rotatably connected and may be prevented from moving in the axial direction. Second engagement portions 6a, which slidably engage the splines 3b of the shaft member 3, are formed on the inner periphery surface of the second member 6. The second engagement portions 6a are, for example, splines which linearly extend in the axial direction and protrude towards the shaft member 3.

Figure 6:
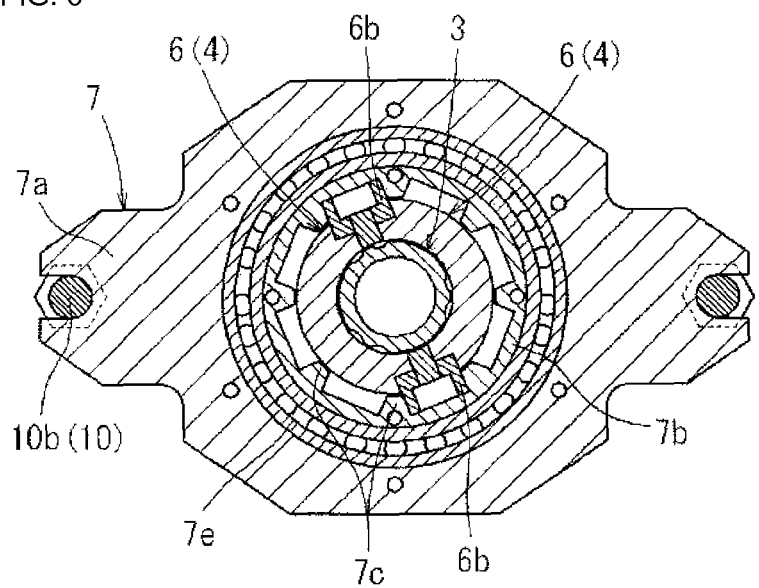
FIG. 6 is a cross-sectional view taken along line VI-VI in FIG. 2.

As shown in FIGS. 3 and 4, the switching mechanism may have a clutch 7 for connecting and disconnecting the rotation mechanism (the second member 6) and the motor 8. As shown in FIGS. 3 and 6, the clutch 7 has a clutch base 7a and a clutch body 7b. The clutch base 7a is moveably attached to the third base 2c in the axial direction by a pair of axial movement mechanism 10. The axial movement mechanism 10 has a cylinder 10a and a pin 10b moving with respect to the cylinder 10a by a liquid pressure in the cylinder 10a. The clutch base 7a is attached to an end portion of the pin 10b.

As shown in FIG. 6, the clutch body 7b has a cylindrical shape, the outer peripheral portion thereof is attached to the clutch base 7a to be axially rotatable by a bearing 7e. The movement in the axial direction can thereby be restricted. The second member 6 is inserted into the clutch body 7b, and a plurality of connection portions 7c are formed at the inner peripheral portion of the clutch body 7b. The connection portions 7c are formed at substantially equal distances in the circumferential direction and protrude towards the second member 6.

As shown in FIG. 6, protrusion portions 6b formed at the second member 6 are always disposed between the connection portions 7c. The protrusion portions 6b protrude from two portions of the outer peripheral surface of the second member 6. Since the protrusion portions 6b are disposed between the connection portions 7c, the clutch body 7b is prevented from rotating towards the second member 6, and the clutch body 7b is allowed to move in the axial direction with respect to the second member 6.

As shown in FIG. 4, the clutch body 7b moves downward in the axial direction with respect to the second member 6 so that the connection portions 7c also engage pins 5b formed at the first member 5. The pins 5b protrude from two portions of the outer peripheral surface of the first member 5. Since the each pin 5b is disposed between the connection portions 7c, the clutch body 7b is regulated from axially rotating with respect to the first member 5. Thus, the first member 5 and the second member 6 are connected by the clutch body 7b so that the first member 5 and the second member 6 are axially rotated at the same speed.

Figure 5:
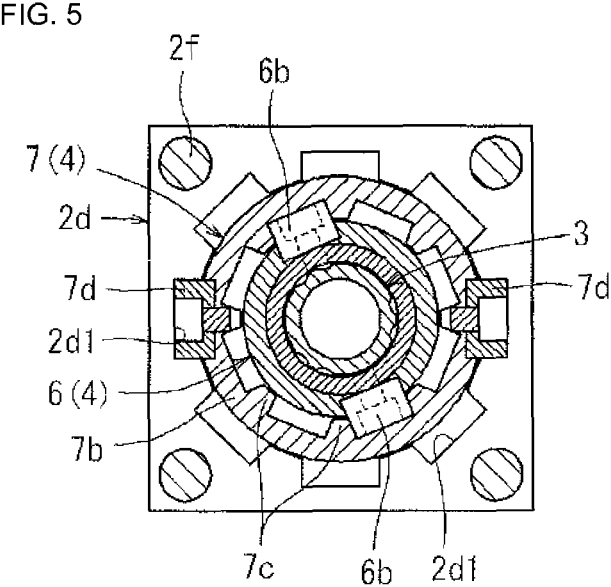
FIG. 5 is a cross-sectional view taken along line V-V in FIG. 2.

As shown in FIGS. 3 and 5, a stopper mechanism is provided between the clutch 7 and the base 2. The stopper mechanism has a stopper member 7d provided at the clutch 7 and an engagement portion 2d1 formed at the fourth base 2d. A pair of stopper members 7d is provided on the outer peripheral surface of the clutch body 7b and protrudes from the outer peripheral surface of the clutch body 7b. A plurality of the engagement portions 2d1 is recessed at a predetermined distance in the circumferential direction at the inner periphery surface of the fourth base 2d. The stopper member 7d is inserted into the engagement portion 2d1 so that the axial rotation of the clutch 7 with respect to the base 2 is prevented. The axial rotation of the second member 6 with respect to the clutch 7 is prevented. Thus, the stopper mechanism may restrict the second member 6 from axially rotating with respect to the base 2. Alternatively, the stopper mechanism can rotate with respect to the base 2.

As shown in FIG. 3, a belt 9 is mounted between the first member 5 and the motor 8. The belt 9 is rotated by the output of the motor 8 and then axially rotates the first member 5 with respect to the base 2. When the clutch 7 is positioned at the upper side, the clutch 7 is separated from the first member 5 and the clutch 7 engages the fourth base 2d. Thus, the second member 6 is prevented from axially rotating with respect to the base 2 by the clutch 7. Since the shaft member 3 is prevented from axially rotating with respect to the second member 6, the axial rotation of the shaft member 3 with respect to the base 2 is prevented. In this state, when the first member 5 is axially rotated by the motor 8, the first member 5 is axially rotated relatively to the shaft member 3. Accordingly, the first member 5 moves (linearly advances) the shaft member 3 in the axial direction.

As shown in FIG. 4, when the clutch 7 is positioned on the lower side, the clutch 7 separates from the fourth base 2d and the clutch 7 engages the first member 5. Thus, when the first member 5 is axially rotated by the motor 8, the second member 6 is axially rotated with the first member 5 by the clutch 7. The second member 6 axially rotates so that the shaft member 3 is axially rotated. The second member 6 and the first member 5 are axially rotated with the same speed. The shaft member 3 is also axially rotated with the same speed by the second member 6. Relative axial rotation does not occur between the shaft member 3 and the first member 5. Then the shaft member 3 does not move in the axial direction with respect to the base 2.

As shown in FIGS. 1 and 2, a moving base 12 is attached to the lower portion of the shaft member 3. The moving base 12 has an upper plate portion 12a, a lower plate portion 12b and a standing portion 12c. The lower portion of the shaft member 3 is attached to the upper plate portion 12a and the lower plate portion 12b to be axially rotatable. The upper plate portion 12a and the lower plate portion 12b are prevented from moving in the axial direction. A pair of standing portions 12c connects the upper plate portion 12a and the lower plate portion 12b.

As shown in FIGS. 1 and 2, a rod 11 is movably inserted through the upper plate portion 12a in the axial direction. The rod 11 extends downwards from the first base 2a. Accordingly, the rod 11 and the moving base 12 may receive torque that can be generated between the base 2 and the shaft member 3.

As shown in FIG. 1, a torque sensor 20 which may measure the torque applied to the shaft member 3 and a rod cell 21 which may measure a force in the axial direction applied to the shaft member 3 are provided at the lower portion of the shaft member 3. The torque sensor 20 is provided between the upper plate portion 12a and the lower plate portion 12b. The rod cell 21 is attached to the lower side of the lower plate portion 12b. A press-fit head 14 is attached to the lower portion of the lower plate portion 12b.

Figure 7:
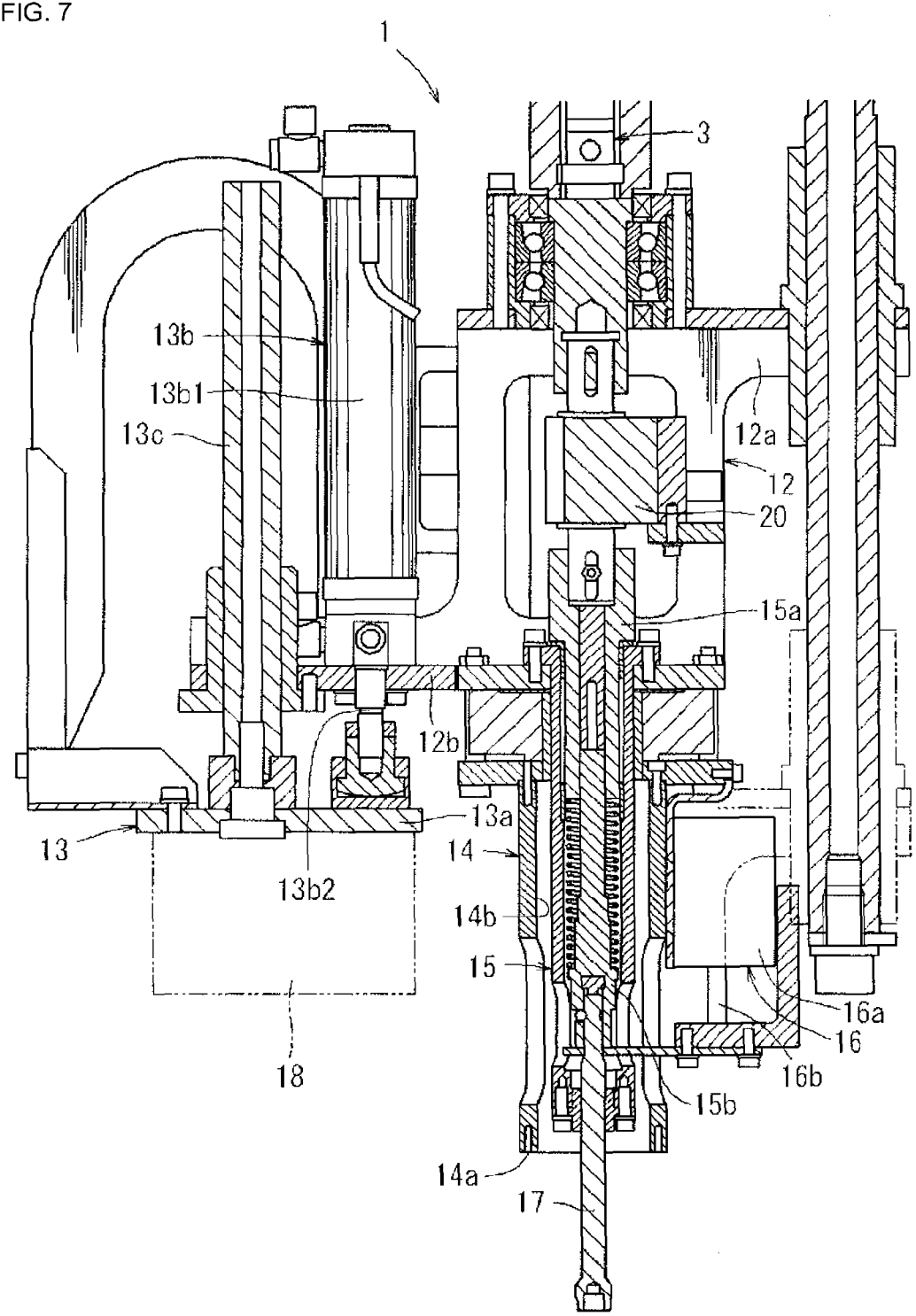
FIG. 7 is a cross-sectional view taken along line VII-VII in FIG. 2.

As shown in FIGS. 1 and 7, the press-fit head 14 has a cylindrical shape and a contacting portion 14a at a tip end thereof. The shaft member 3 moves in the axial direction so that the contacting portion 14a presses a member to fit the member into another member. A hole 14b is formed at a shaft center of the press-fit head 14. A tightening tool 15 may be attached to the hole 14b.

As shown in FIG. 7, the tightening tool 15 has a tool base 15a and a socket 15b. The tool base 15a is attached to the lower end portion of the shaft member 3. The socket 15b is moveably and adjustably attached to the tool base 15a, and the socket 15b is regulated from axial rotating with respect to the socket 15b. A tool 17 such as a screw is removably mounted on the socket 15b. The shaft member 3 axially rotates so that the tool base 15a and the socket 15b are axially rotated, and then the tool 17 axially rotates. Thus, tightening tool 15 can apply the torque to a fastener member.

As shown in FIGS. 1 and 7, an axial movement mechanism 16 is provided at the press-fit head 14. The axial movement mechanism 16 has a cylinder 16a mounted on the press-fit head 14 and a pin 16b moving with respect to the cylinder 16a by liquid pressure inside the cylinder 16a. The pin 16b is connected to the socket 15b. Accordingly, the axial movement mechanism 16 may move the socket 15b with respect to the tool base 15a in the axial direction. The axial movement mechanism 16 may also move the shaft member 3 in the axial direction.

As shown in FIGS. 4 and 7, the clutch 7 is moved to the lower side and the shaft member 3 is axially rotated so that the tightening tool 15 is axially rotated by the shaft member 3. The tightening tool 15 applies the torque to the fastener member. After the fastener member is tightened with a predetermined torque, the socket 15b is moved to the upper side by the axial movement mechanism 16. Accordingly, the tool 17 is separated from the fastener member.

Next, the clutch 7 is moved to the upper side and the stopper member 7d is engaged with the engagement portion 2d1. When the stopper member 7d is shifted with respect to the engagement portion 2d1, the clutch 7 is axially rotated with the shaft member 3 and the stopper member 7d and the engagement portion 2d1 are aligned in a state shown in FIG. 4. At this time, since the tool 17 is separated from the fastener member, there is no influence on the tightening torque of the fastener member, even though the shaft member 3 is axially rotated.

A measurement tool can be mounted on the press-fit head 14 instead of the tool 17 shown in FIG. 7. The measurement tool has a sensor emitting a detection signal when contacting an article. When the measurement tool moves in the axial direction with the shaft member 3 and contacts the article, the detection signal is transmitted. A controller (not shown), which receives the detection signal, measures the position or height of the article from the position of the shaft member 3 in the axial direction.

It is preferable that the measurement tool be attached to a position corresponding to a recessed portion formed on an article pressed by the press-fit head 14. An example of such a location would be the center of the shaft. In this case, the press-fit head 14 can press the article while the measurement tool is mounted on the press-fit head 14.

As shown in FIGS. 1 and 7, a lifting mechanism 13 is attached to the lower plate portion 12b of the moving base 12. The lifting mechanism 13 has a lifting base 13a and cylinder mechanism 13b. The cylinder mechanism 13b has a cylinder attached to the lower plate portion 12b and a pin moving up and down with respect to the cylinder. The lifting base 13a is attached to the end portion of the pin. A guide member 13c is stood on the lifting base 13a and the guide member 13c is slidably mounted with respect to the lower plate portion 12b in the axial direction.

As shown in FIG. 1, an assembling hand 18 is mounted on the lifting base 13a. The assembling hand 18 has a plurality of fingers (not shown) and the plurality of fingers are relatively moved by electric power supplied from a cable 19 and can grip the article. Accordingly, the assembling hand 18 is moved in the axial direction along with the lower plate portion 12b through the movement of the shaft member 3 in the axial direction. It can be lifted in the axial direction by the lifting mechanism 13.

As described above, as shown in FIG. 1, the assembling apparatus 1 comprises the shaft member 3, the base 2 and the drive unit. The shaft member 3 has linear assembling function and rotational assembling function. The base 2 supporting the shaft member 3 may be movable in the axial direction and axially rotatable. The drive unit (the motor 8 and the power conversion mechanism 4) moves in the axial direction and axially rotates the shaft member 3.

Accordingly, the shaft member 3 may perform a linear assembling work using movement in the axial direction and a rotational assembly work using axial rotation. In addition, the assembling apparatus 1 may perform both linear assembling work and rotational assembling work using one shaft member 3. Thus, the assembling apparatus 1 can be manufactured such that it is small and/or lightweight. For example, the apparatus of the invention can be smaller or lighter in weight compared to the assembling apparatus of the related art. Such related art has a dedicated shaft member which performs linear motion and a dedicated shaft member which performs rotational motion.

As shown in FIG. 1, the drive unit comprises the motor 8 and the power conversion mechanism 4 which switchably converts the output of the motor 8 to the movement in the axial direction. Alternatively, it converts the output to axial rotation of the shaft member 3.

Accordingly, the assembling apparatus 1 may move in the axial direction and axially rotate the shaft member 3 using the power conversion mechanism 4. Thus, the assembling apparatus 1 may perform the assembling work using the movement of the shaft member 3 in the axial direction and the assembling work using the axial rotation of the shaft member 3. In addition, the assembling apparatus 1 may move in the axial direction and can axially rotate the shaft member 3 using the output of one motor 8. Thus, the assembling apparatus 1 may be configured smaller or lighter in weight compared to the assembling apparatus of the related art. In the related art, each movement is performed by a separate driving source. Since the apparatus is lightweight, the assembling apparatus 1 may perform the assembling work at high speed.

As shown in FIGS. 3 and 4, the power conversion mechanism 4 comprises the linear motion mechanism (the first member 5), the rotation mechanism (the second member 6) and the switching mechanism (the clutch 7). The linear motion mechanism is connected to the motor 8, and may also move the shaft member 3 with respect to the base 2 in the axial direction by the output of the motor 8. The rotation mechanism may axially rotate the shaft member 3 with respect to the base 2. The switching mechanism may switch between connection and disconnection of the motor 8 and the rotation mechanism. Accordingly, the motor 8 and the rotation mechanism are connected and disconnected by the switching mechanism so that the shaft member 3 can be switched between movement in the axial direction and the axial rotation.

As shown in FIGS. 3 and 4, the linear motion mechanism has the first member 5 in which the shaft member 3 is inserted. The first member 5 is attached to the base 2 to be axially rotatable. The first engagement portion 5a is formed at the first member 5. The first engagement portion 5a slidably engages the male screw 3a formed at the shaft member 3. The male screw 3a extends in a spiral manner. The rotation mechanism has the second member 6 in which the shaft member 3 is inserted. The second member 6 is attached to the base 2 to be axially rotatable. The second engagement portion 6a is formed at the second member 6. The second engagement portion 6a slidably engages the splines 3b formed on the shaft member 3. The splines 3b extend in the axial direction.

Accordingly, the first member 5 can be axially rotated with respect to the shaft member 3 by the motor 8 so that the shaft member 3 moves with respect to the base 2. It uses the first engagement portion 5a and the male screw 3a to accomplish this. The second member 6 axially rotates with respect to the base 2. The second member 6 uses the motor 8 so that the shaft member 3 axially rotates with respect to the base 2. It uses the second engagement portion 6a and the splines 3b to accomplish this.

As shown in FIGS. 3 and 4, the first member 5 is axially rotated with respect to the base 2 by the motor 8. The switching mechanism has a clutch 7 which performs the connection and the disconnection of the first member 5 and the second member 6. Accordingly, when the first member 5 and the second member 6 are connected by the clutch 7, the second member 6 axially rotates with respect to the base 2 and the shaft member 3 axially rotates with respect to the base 2. At this time, the shaft member 3, the first member 5 and the second member 6 are axially rotated with the same rotational speed. Thus, the first member 5 does not axially rotate with respect to the shaft member 3. Further, the shaft member 3 does not move with respect to the base 2 in the axial direction.

As shown in FIG. 3, the assembling apparatus 1 comprises the stopper mechanism (the stopper member 7d) releasably connecting the second member 6 and the base 2. Accordingly, the second member 6 is prevented from axially rotating with respect to the base 2 by the stopper mechanism. Thus, in this state, the first member 5 is axially rotated with respect to the base 2 so that the first member 5 may be axially rotated with respect to the shaft member 3. Thus, the first member 5 may move the shaft member 3 in the axial direction.

As shown in FIGS. 3 and 4, the clutch 7 has the clutch body 7b, the connection portion 7c and the stopper member 7d. The clutch body 7b is prevented from axially rotating with respect to the second member 6 due to engagement with the second member 6. The clutch body 7b is movable in the axial direction with respect to the second member 6. The connection portion 7c is provided on the clutch body 7b. When the clutch body 7b moves in the axial direction with respect to the second member 6, the connection portion 7c may engage or disengage from the first member 5. The stopper member 7d may be provided on the clutch body 7b. The stopper member 7d may engage the base 2 when the clutch body 7b moves in the axial direction while the connection portion 7c does not engage the first member 5. In this way, the first member 5 and the second member 6 may be connected and disconnected by the clutch 7. The second member 6 and the base 2 may be connected and disconnected by the clutch 7.

As shown in FIG. 7, the assembling apparatus 1 comprises the tightening tool 15 and the axial movement mechanism 16. The tightening tool 15 is mounted on the shaft member 3. When the tightening tool 15 is axially rotated by the axial rotation of the shaft member 3, torque is transferred to the fastener member. Torque is also transferred to the axial movement mechanism 16. Such force may move the tightening tool 15 in the axial direction with respect to the shaft member 3. Accordingly, the assembling apparatus 1 may apply torque to the fastener member using the tightening tool 15. In addition, the tightening tool 15 may move via the axial movement mechanism 16 after the torque is applied to the fastener member. It moves away from the fastener member without moving the shaft member 3 in the axial direction. Thus, the torque applied to the fastener member is not affected by the operation in moving the shaft member 3 in the axial direction. For example, when the shaft member 3 is rotated axially to the point whereby it can move axially, the torque is not affected.

The invention is not limited to the embodiments described above and may also be configurations as described below. For example, one of the configurations includes a connection mechanism connecting the motor 8 and the first member 5. It may also include a switching mechanism for connecting and the disconnecting the first member 5 and the second member 6. Another configuration may have more numerous parts. For example, it may have a first connection mechanism for connecting the motor 8 and the first member 5. It may also have a second connection mechanism for connecting the motor 8 and the second member 6. Further, it may have a first switching mechanism for connecting and the disconnecting the motor 8 and the first connection mechanism. Finally, it may have a second switching mechanism for switching the connection and the disconnection of the motor 8 and the second connection mechanism.

One of the configurations has a drive unit which includes the motor 3 and the switching mechanism (clutch 7). Another configuration may be configured in which the drive unit separately has a first motor which may rotate the first member 5 and a second motor 6 which may rotate the second member 6. The first motor and the second motor may be controlled by a controller so that the shaft member 3 may be moved in the axial direction and axially rotated.

One of the configurations has a clutch 7 that moves in the axial direction. Another configuration may have a clutch that is configured from a plurality of members. The positional relationship between the plurality of members may be changed whereby the clutch is deformed. For example, the members may be expanded and contracted in the axial direction so that the first member 5 and the second member 6 may be connected or disconnected.

In another configuration, the stopper mechanism may have a stopper member connected to the second member 6 and the base 2 which is capable of releasing the second member 6 and the base 2. In such a configuration, the clutch 7 may be arranged as a separate structure from the stopper mechanism.

In another configuration, the shaft member 3 may be configured in such a manner that at least one of the press-fit head 14, the assembling hand 18 and the measurement tool. The press-fit head 14 presses the article when the shaft member 3 moves in the axial direction. The assembling hand 18 may have a plurality of fingers which may grip an article. The measurement tool, which contacts the article and transmits the detection signal when the shaft member 3 moves in the axial direction, may be movably mounted between a use position and a non-use position. For example, the press-fit head 14 or the like may be mounted on the shaft member 3 whereby it may move rotationally or linearly. Accordingly, the press-fit head 14 or the like may be used by being positioned in the use position and may be moved to the non-use position without being removed from the shaft member 3. Thus, the assembling apparatus 1 may easily perform a multitude of works.

In other configurations, a one-touch device may be provided. For example, a press-fit head 14, a tightening tool 15, an assembling hand 18 and/or a measurement tool may be provided.

In another configuration, the tightening tool 15 may be attached to the shaft member 3 without through the press-fit head 14. In another configuration, a coating tool which may coat a coating portion of a member, or a stamping tool which stamps a member may be mounted on the shaft member 3.

In another configuration, the assembling apparatus 1 may have a linear motion mechanism which may axially rotate the shaft member 3 with respect to the base 2. Further, it may have a switching mechanism which may prevent the first member 5 from rotating with respect to the base 2. When both the first member 5 is prevented from rotating with respect to the base 2 and the shaft member 3 is axially rotated with respect to the base 2, the shaft member 3 moves in the axial direction with respect to the base 2. When the first member 5 and the shaft member 3 are axially rotated with respect to the base 2, they may both be rotated in conjunction with one another.

In another configuration, the switching mechanism may have first and second clutch plates. The first clutch plate is attached to the first member 5 or the second member 6. The second clutch plate is movably attached to the other of the first member 5 of the second member 6 in the axial direction and prevented from axially rotating. The second clutch contacts the first clutch in the axial direction so that the first and the second clutch plates are axially, integrally rotated by a frictional force generated between the first and the second clutch plates.

In another configuration, the power conversion mechanism 4 may have a rotation mechanism connected to the motor 8. It can axially rotate the shaft member 3 with respect to the base 2 using the output of the motor 8. It may also include a linear motion mechanism which can move the shaft member 3 with respect to the base 2 in the axial direction. It may also include a switching mechanism which connects and disconnects the linear motion mechanism and the motor 8. Such a switching mechanism may also connect the linear motion mechanism and the motor 8 so that the shaft member can be moved in the axial direction by the linear motion mechanism.

The invention claimed is:

1. An assembling apparatus comprising:
   a shaft member having a linear assembling function and a rotational assembling function; and
   a base configured to support the shaft member so that the shaft member is movable in an axial direction and axially rotatable, the base including a recess portion formed at an inner periphery of the base; and
   a drive unit which can move the shaft member in the axial direction and axially rotate the shaft member,
   wherein the drive unit comprises a motor and a power conversion mechanism switchably converting output of the motor between axial movement and axial rotation of the shaft member,
   wherein the power conversion mechanism includes a clutch, the clutch including a cylindrically shaped clutch body so that the shaft member passes through a center of the clutch body, the clutch body being movable in the axial direction of the shaft member between a first axial position and a second axial position, the clutch body including a stopper member formed on an outer periphery of the cylindrically shaped clutch body,
   wherein, upon the clutch body being disposed in the first axial position, the stopper member of the clutch body is disposed in the recess portion of the base and the shaft member is configured to move in the axial direction, and
   wherein, upon the clutch body being disposed in the second axial position, the stopper member of the clutch is separated from the recess portion of the base, and the shaft member is configured to rotate axially.

2. The assembling apparatus of claim 1, wherein the power conversion mechanism comprises:
   a linear motion mechanism which is connected to the motor, the linear motion mechanism capable of moving the shaft member in the axial direction with respect to the base using the output of the motor,
   a rotation mechanism which axially rotates the shaft member with respect to the base, and
   a switching mechanism, that includes the clutch, the switching mechanism configured to connect and disconnect the motor and the rotation mechanism.

3. The assembling apparatus of claim 2, wherein:
   the linear motion mechanism comprises a first member in which the shaft member is inserted, the first member is attached to the base such that it is axially rotatable, a first engagement portion is formed on the first member, the first engagement portion slidably engages a male screw formed on the shaft member, the male screw extends in a spiral manner,
   the rotation mechanism comprises a second member in which the shaft member is inserted, the second member is attached to the base such that it is axially rotatable, a second engagement portion is formed at the second member, the second engagement portion slidably engages a spline formed on the shaft member, and the spline extends in the axial direction.

4. The assembling apparatus of claim 3, wherein:
   the first member is axially rotated by the motor with respect to the base,
   wherein the clutch is configured to connect or disconnect the first member and the second member.

5. The assembling apparatus of claim 4, wherein the clutch body is prevented from rotating axially with respect to the second member via engagement with the second member, and the clutch body is movable in the axial direction with respect to the second member,
   and the clutch further comprises a connection portion provided at the clutch body, the connection portion engaging or disengaging from the first member when the clutch body moves in the axial direction with respect to the second member, and
   the stopper member engaging the base when the clutch body moves in the axial direction when the connection portion does not simultaneously engage the first member.

6. The assembling apparatus of claim 3, further comprising a stopper mechanism connected to and capable of releasing the second member and the base.

7. The assembling apparatus of claim 1, further comprising at least one of: (a) a press-fit head which presses an article when the shaft member moves in the axial direction, (b) an assembling hand having a plurality of fingers which grip an article, and (c) a measurement tool which contacts the article and transmits a detection signal when the shaft member moves in the axial direction, and wherein (a), (b) and/or (c) is movably mounted on the shaft member between a use position and a non-use position.

8. The assembling apparatus of claim 1, further comprising:

a tightening tool mounted on the shaft member, the tightening tool axially rotated by axial rotation of the shaft member so that the tightening tool applies a torque to a fastener member, and an axial movement mechanism capable of moving the tightening tool in the axial direction with respect to the shaft member.

9. An assembling apparatus comprising:

a shaft member having a linear assembling function and a rotational assembling function; and a base configured to support the shaft member so that the shaft member is movable in an axial direction and axially rotatable; and a drive unit configured to move the shaft member in the axial direction and axially rotate the shaft member, wherein the drive unit comprises a motor and a power conversion mechanism switchably converting output of the motor between axial movement and axial rotation of the shaft member, wherein the power conversion mechanism comprises:

a linear motion mechanism which is connected to the motor, the linear motion mechanism configured to move the shaft member in the axial direction with respect to the base using the output of the motor, a rotation mechanism which axially rotates the shaft member with respect to the base, and a switching mechanism configured to connect and disconnect the motor and the rotation mechanism, wherein the linear motion mechanism comprises a first member in which the shaft member is inserted, the first member is attached to the base such that it is axially rotatable, a first engagement portion is formed on the first member, the first engagement portion slidably engages a male screw formed on the shaft member, the male screw extends in a spiral manner, the rotation mechanism comprises a second member in which the shaft member is inserted, the second member is attached to the base such that it is axially rotatable, a second engagement portion is formed at the second member, the second engagement portion slidably engages a spline formed on the shaft member, and the spline extends in the axial direction, wherein the power conversion mechanism includes a cylindrically shaped clutch body so that the shaft member passes through a center of the clutch body, a stopper member formed on an outer periphery of the cylindrically shaped clutch body, the clutch body being movable in the axial direction of the shaft member between a first axial position and a second axial position, wherein, upon the clutch body being disposed in the first axial position, the clutch body is engaged with the second member which is disposed between the clutch body and the shaft member and disengaged from the first member, and the stopper member formed on the outer periphery of the clutch body engages with the base, and the shaft member is configured to move in the axial direction, and wherein, upon the clutch body being disposed in the second axial position, the stopper member of the clutch is separated from the base, and the clutch body engages with both of the first member and the second member that are disposed between the clutch body and the shaft member, and the shaft member is configured to rotate axially.

* * * * *